United States Patent
Adams, Jr. et al.

(10) Patent No.: US 8,345,130 B2
(45) Date of Patent: Jan. 1, 2013

(54) DENOISING CFA IMAGES USING WEIGHTED PIXEL DIFFERENCES

(75) Inventors: James E. Adams, Jr., Rochester, NY (US); Mrityunjay Kumar, Rochester, NY (US); Efrain O. Morales, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 527 days.

(21) Appl. No.: 12/696,081

(22) Filed: Jan. 29, 2010

(65) Prior Publication Data
US 2011/0187902 A1  Aug. 4, 2011

(51) Int. Cl.
*H04N 9/64* (2006.01)
*H04N 5/217* (2006.01)

(52) U.S. Cl. .................... 348/251; 348/241
(58) Field of Classification Search .......... 348/242, 348/251, 252
See application file for complete search history.

(56) References Cited

U.S. PATENT DOCUMENTS

| | | | |
|---|---|---|---|
| 5,644,358 A | 7/1997 | Miyano et al. | |
| 6,041,145 A * | 3/2000 | Hayashi et al. | 382/268 |
| 6,229,578 B1 | 5/2001 | Acharya et al. | |
| 6,625,325 B2 | 9/2003 | Gindele et al. | |
| 7,110,612 B1 * | 9/2006 | Wang | 382/262 |
| 7,369,165 B2 | 5/2008 | Bosco et al. | |
| 7,418,130 B2 | 8/2008 | Keshet et al. | |
| 7,792,386 B1 * | 9/2010 | Worthington et al. | 382/279 |
| 7,956,910 B2 * | 6/2011 | Lim et al. | 348/252 |
| 2002/0126892 A1 | 9/2002 | Gindele et al. | |
| 2004/0246350 A1 | 12/2004 | Sakamoto | |
| 2005/0025378 A1 | 2/2005 | Maurer | |
| 2005/0276504 A1 * | 12/2005 | Chui et al. | 382/264 |
| 2006/0152596 A1 | 7/2006 | Adams, Jr. et al. | |
| 2007/0002154 A1 * | 1/2007 | Kang et al. | 348/272 |
| 2007/0177816 A1 | 8/2007 | Yoo et al. | |
| 2007/0268533 A1 | 11/2007 | Kijima et al. | |
| 2009/0052797 A1 | 2/2009 | Matsushita et al. | |
| 2009/0219417 A1 | 9/2009 | Tsuruoka | |
| 2009/0303357 A1 * | 12/2009 | Tajima et al. | 348/246 |

OTHER PUBLICATIONS

Bakalexis S. A. et al.: "Edge Detection and Image Segmentation Based on Nonlinear Anisotropic Diffusion", Digital Signal Processing, 2002, DSP 2002, 2002 14th International Conference on Santorini, Greece, Jul. 1-3, 2002, Piscataway, NJ, USA, IEEE, US, vol. 2, Jul. 1, 2002, pp. 1203-1206, XP010600070, ISBN: 978-0-7803-7503-1, Paragraph [0002]-Paragraph [0005], Figures 1-6.

(Continued)

*Primary Examiner* — Sinh Tran
*Assistant Examiner* — Jason Flohre
(74) *Attorney, Agent, or Firm* — Kevin E. Spaulding

(57) ABSTRACT

A method for reducing noise in an image captured using a digital image sensor having pixels being arranged in a rectangular minimal repeating unit, comprising: computing first weighted pixel differences by combining first pixel differences between the pixel value of a central pixel and pixel values for nearby pixels of the first channel in a plurality of directions with corresponding local edge-responsive weighting values; computing second weighted pixel differences by combining second pixel differences between pixel values for pixels of at least one different channel in the plurality of directions with corresponding local edge-responsive weighting values; and computing a noise-reduced pixel value for the central pixel by combining the first and second weighted pixel differences with the pixel value for the central pixel.

13 Claims, 10 Drawing Sheets

OTHER PUBLICATIONS

Pietro Perona, et al.: "Scale—Space and Edge Detection Using Anisotropic Diffusion", IEEE Transactions on Pattern Analysis and Machine Intelligence, IEEE Service Center, Los Alamitos, CA, US, vol. 12, No. 7, Jul. 1, 1990, pp. 629-639, XP000136967, ISSN: 0162-8828, DOI: DOI: 10.1109/34.56205 cited in the application paragraph [0004]-paragraph [0005].

Perona et al., "Scale-space and edge detection using anisotropic diffusion", IEEE Transactions on Pattern Analysis and Machine Intelligence, vol. 12, pp. 629-639, 1990.

Tschumperlé et al., "Diffusion PDEs on vector-valued images", IEEE Signal Processing Magazine, vol. 19, Issue 5, pp. 16-25, Sep. 2002.

Leonid I. Rudin et al., "Nonlinear total variation based noise removal algorithms", Elsevier Science Publishers B.V., Physica E. 60 (1992) 259-268.

* cited by examiner

FIG. 1 [Prior Art]

| $R_5$ | $G_B$ | $R_H$ | $G_N$ | $R_U$ | $G_\Gamma$ |
|---|---|---|---|---|---|
| $G_4$ | $B_A$ | $G_G$ | $B_M$ | $G_T$ | $B_Z$ |
| $R_3$ | $G_9$ | $R_F$ | $G_L$ | $R_S$ | $G_Y$ |
| $G_2$ | $B_8$ | $G_E$ | $B_K$ | $G_R$ | $B_X$ |
| $R_1$ | $G_7$ | $R_D$ | $G_J$ | $R_Q$ | $G_W$ |
| $G_0$ | $B_6$ | $G_C$ | $B_I$ | $G_P$ | $B_V$ |

FIG. 7

DENOISING CFA IMAGES USING WEIGHTED PIXEL DIFFERENCES

CROSS-REFERENCE TO RELATED APPLICATIONS

Reference is made to commonly assigned, co-pending U.S. Patent Application Publication No. 2011/0188748, entitled: "Iteratively Denoising Color Filter Array Images", by J. Adams, et al., which is incorporated herein by reference.

FIELD OF THE INVENTION

The present invention relates to producing a noise-reduced color filter array image from a color filter array image using partial differential equation techniques.

BACKGROUND OF THE INVENTION

A single-sensor digital camera generally employs a color filter array (CFA) in order to capture full-color information from a single two dimensional array of light-sensitive pixels. The CFA comprises an array of color filters that filter the light being detected by each pixel. As a result, each pixel receives light from only one color, or in the case of a panchromatic or "clear" filter, from all colors. In order to reproduce a full-color image from the CFA image, three color values must be produced at each pixel location. This is accomplished by interpolating the missing color values from neighboring pixel values. This interpolation process is often referred to as CFA interpolation or demosaicing.

Prior to CFA interpolation, the image data exists in a sparse dataset representation, i.e., only one color value per pixel. It is computationally advantageous to noise-clean, or denoise, the image data in this representation rather than after CFA interpolation when there will be three or more color values per pixel to be processed. Many approaches to denoising CFA image data are found in the prior art.

A number of well-known methods for denoising full-color images can also be applied to CFA images with appropriate adjustments. One such method is anisotropic diffusion, a type of partial differential equation (PDE) denoising, as first described by Perona et al. in the article "Scale-space and edge detection using anisotropic diffusion", IEEE Transactions on Pattern Analysis and Machine Intelligence, Vol. 12, pp. 629-639, 1990. Perona et al. only discuss denoising full-resolution grayscale (luminance) images and do not teach the denoising of full-color or CFA images.

Tschumperlé et al., in the article "Diffusion PDEs on vector-valued images", IEEE Signal Processing Magazine, Vol. 19, Issue 5, pp. 16-25, September 2002, expand on the method of Perona et al. to include the denoising of full-color images, but no mention is made of CFA images.

Many approaches simply treat each color within the CFA image separately, resulting in independent grayscale (luminance) denoising operations. Examples are found in U.S. Pat. No. 6,229,578, to Acharya et al., entitled "Edge-detection based noise removal algorithm," U.S. Pat. No. 6,625,325 to Gindele et al., entitled "Noise cleaning and interpolating sparsely populated color digital image using a variable noise cleaning kernel," U.S. Pat. No. 7,369,165, to Bosco et al., entitled "Noise filter for Bayer pattern image data," U.S. Pat. No. 7,418,130 to Keshet et al., entitled "Edge-sensitive denoising and color interpolation of digital images," and U.S. Patent Application 2009/0219417, to Tsuruokam entitled "Image capturing system and computer readable recording medium for recording image processing program." All these approaches suffer from the inability to directly reduce chrominance noise in the CFA image.

Other approaches address reducing both luminance and chrominance noise explicitly in CFA images. Combinations of different channels that exist at the same location are also called channels. The chrominance channels, either explicitly or implicitly are of the form of red minus green (R-G) and blue minus green (B-G), or red minus luminance (R-Y), and blue minus luminance (B-Y). Examples of this approach are given in U.S. Patent Application 2006/0152596 to Adams Jr. et al., entitled "Noise cleaning sparsely populated color digital images," and U.S. Patent Application 2009/0052797 to Matsushita et al., entitled "Imaging device, image processing device, image processing method, program for image processing method, and recording medium having program for image processing method recorded thereon." The problem with these approaches is that while chrominance values such as R-G are easy to compute, they are generally not devoid of luminance information, such as edge and text detail. This, in turn, reduces the ability to denoise chrominance information without degrading luminance information in the image. A better luminance-chrominance transform is described in U.S. Pat. No. 5,644,358 to Miyano et al., entitled "Automatic white balance adjusting device." This transform provides an improved separation of luminance and chrominance information while still being easy to compute.

Thus, there exists a need for a means of denoising luminance and chrominance information in a CFA image without requiring explicit or implied demosaicking operations.

SUMMARY OF THE INVENTION

In accordance with the present invention, there is provided a method for reducing noise in an image captured by a digital image sensor comprising a two dimensional array of light-sensitive pixels including pixels for at least three distinct channels, the pixels being arranged in a rectangular minimal repeating unit, comprising using a processor in determining noise reduced pixel values for each pixel of a first channel using a noise reducing process including:

a) computing a set of local edge-responsive weighting values for a plurality of directions around a central pixel of the first channel;

b) computing first pixel differences between the pixel value of the central pixel and pixel values for nearby pixels of the first channel in the plurality of directions;

c) computing first weighted pixel differences by combining the first pixel differences with the set of local edge-responsive weighting values;

d) computing second pixel differences between pixel values for pixels of at least one different channel nearby the central pixel and pixel values for nearby pixels of the at least one different channel in the plurality of directions;

e) computing second weighted pixel differences by combining the second pixel differences with the set of local edge-responsive weighting values; and f) computing a noise-reduced pixel value for the central pixel by combining the first and second weighted pixel differences with the pixel value for the central pixel.

An advantage of the present invention is that both the luminance noise and the chrominance noise of the CFA image are reduced without the need of performing demosaicing (CFA interpolation) prior to or as part of the denoising process.

A further advantage of the present invention is a reduction of computational effort required to denoise the CFA image by only denoising a single channel at each pixel location rather than the usual multiple channels.

An additional advantage of the present invention is that both the luminance noise and the chrominance noise of the CFA image are reduced using a single process rather than two separate processes.

This and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 7 is a pixel neighborhood used in denoising the CFA image;

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Because digital cameras employing imaging devices and related circuitry for signal capture and correction and for exposure control are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

Figure 1:
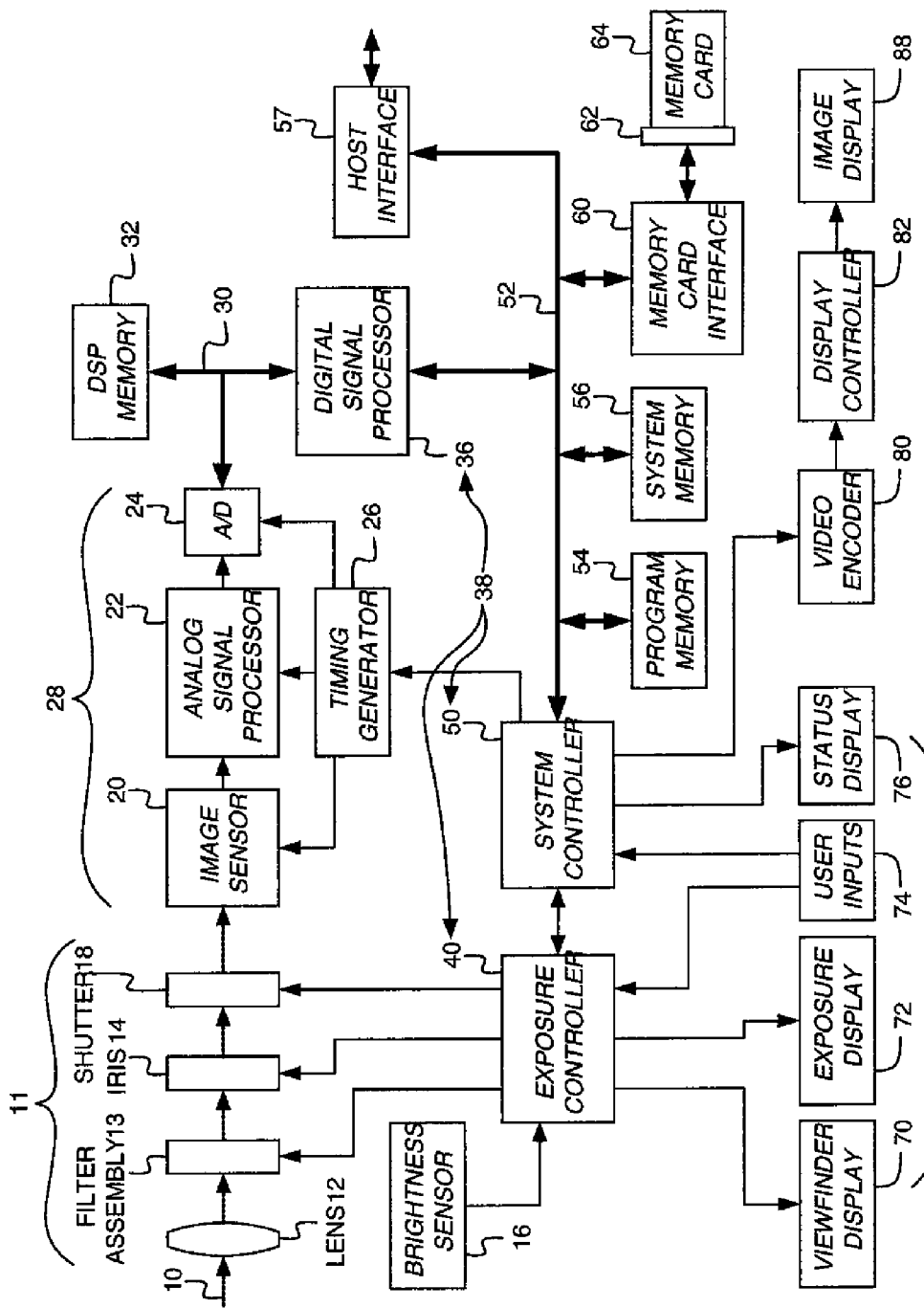
FIG. 1 is a block diagram of a typical digital camera for implementing the present invention.

Turning now to FIG. 1, a block diagram of an image capture device embodying the present invention is shown. In this example, the image capture device is shown as a digital camera. However, although a digital camera will now be explained, the present invention is clearly applicable to other types of image capture devices as well. In the disclosed camera, light 10 from the subject scene is input to an imaging stage 11, where the light is focused by lens 12 to form an image on a solid state color filter array image sensor 20. Color filter array image sensor 20 converts the incident light to an electrical signal for each picture element (pixel). The color filter array image sensor 20 of the preferred embodiment is a charge coupled device (CCD) type or an active pixel sensor (APS) type. (APS devices are often referred to as CMOS sensors because of the ability to fabricate them in a Complementary Metal Oxide Semiconductor process.) Other types of image sensors having two-dimensional array of pixels can also be used provided that they employ the patterns of the present invention. The color filter array image sensor 20 for use in the present invention comprises a two-dimensional array of color pixels as will become clear later in this specification after FIG. 1 is described.

The amount of light reaching the color filter array image sensor 20 is regulated by an iris block 14 that varies the aperture and a neutral density (ND) filter block 13 that includes one or more ND filters interposed in the optical path. Also regulating the overall light level is the time that a shutter 18 is open. An exposure controller 40 responds to the amount of light available in the scene as metered by a brightness sensor block 16 and controls all three of these regulating functions.

This description of a particular camera configuration will be familiar to one skilled in the art, and it will be obvious that many variations and additional features are present. For example, an autofocus system can be added, or the lens can be detachable and interchangeable. It will be understood that the present invention can be applied to any type of digital camera, where similar functionality is provided by alternative components. For example, the digital camera can be a relatively simple point-and-shoot digital camera, where the shutter 18 is a relatively simple movable blade shutter, or the like, instead of the more complicated focal plane arrangement. The present invention can also be practiced using imaging components included in non-camera devices such as mobile phones and automotive vehicles.

The analog signal from the color filter array image sensor 20 is processed by analog signal processor 22 and applied to analog-to-digital (A/D) converter 24. A timing generator 26 produces various clocking signals to select rows and pixels and synchronizes the operation of analog signal processor 22 and A/D converter 24. An image sensor stage 28 includes the color filter array image sensor 20, the analog signal processor 22, the A/D converter 24, and the timing generator 26. The components of image sensor stage 28 can be separately fabricated integrated circuits, or they can be fabricated as a single integrated circuit as is commonly done with CMOS image sensors. The resulting stream of digital pixel values from the A/D converter 24 is stored in a digital signal processor (DSP) memory 32 associated with a digital signal processor (DSP) 36.

The DSP 36 is one of three processors or controllers in this embodiment, in addition to a system controller 50 and the exposure controller 40. Although this partitioning of camera functional control among multiple controllers and processors is typical, these controllers or processors can be combined in various ways without affecting the functional operation of the camera and the application of the present invention. These controllers or processors can include one or more digital signal processor devices, microcontrollers, programmable logic devices, or other digital logic circuits. Although a combination of such controllers or processors has been described, it should be apparent that one controller or processor can be designated to perform all of the needed functions. All of these variations can perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in the DSP memory 32 according to a software program permanently stored in a program memory 54 and copied to DSP memory 32 for execution during image capture. DSP 36 executes the software necessary for practicing image processing described below. DSP memory 32 can be any type of random access memory, such as SDRAM. A bus 30 including a pathway for address and data signals connects DSP 36 to its related DSP memory 32, A/D converter 24 and other related components.

System controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing exposure controller 40 to operate the lens 12, ND filter block 13, iris block 14, and shutter 18 as previously described, directing the timing generator 26 to operate the color filter array image sensor 20 and associated elements, and directing DSP 36 to process the captured image data. After an image is captured and processed, the final image file stored in DSP memory 32 is transferred to a host computer via host interface 57, stored on a removable memory card 64 or other storage device, and displayed for the user on an image display 88.

A system controller bus 52 includes a pathway for address, data and control signals, and connects system controller 50 to DSP 36, program memory 54, a system memory 56, host interface 57, a memory card interface 60 and other related components. Host interface 57 provides a high speed connection to a personal computer (PC) or other host computer for transfer of image data for display, storage, manipulation or printing. This interface can be an IEEE1394 or USB2.0 serial interface or any other suitable digital interface. Memory card 64 is typically a Compact Flash (CF) card inserted into a memory card socket 62 and connected to the system controller 50 via memory card interface 60. Other types of storage that can be utilized include without limitation PC-Cards, MultiMedia Cards (MMC), or Secure Digital (SD) cards.

Processed images are copied to a display buffer in system memory 56 and continuously read out via video encoder 80 to produce a video signal. This signal is output directly from the camera for display on an external monitor, or processed by display controller 82 and presented on image display 88. This display is typically an active matrix color liquid crystal display (LCD), although other types of displays are used as well.

A user interface 68, including all or any combination of a viewfinder display 70, an exposure display 72, a status display 76, the image display 88, and user inputs 74, is controlled by a combination of software programs executed on exposure controller 40 and system controller 50. User inputs 74 typically include some combination of buttons, rocker switches, joysticks, rotary dials or touchscreens. Exposure controller 40 operates light metering, exposure mode, autofocus and other exposure functions. The system controller 50 manages a graphical user interface (GUI) presented on one or more of the displays, e.g., on image display 88. The GUI typically includes menus for making various option selections and review modes for examining captured images.

Exposure controller 40 accepts user inputs selecting exposure mode, lens aperture, exposure time (shutter speed), and exposure index or ISO speed rating and directs the lens 12 and shutter 18 accordingly for subsequent captures. The brightness sensor block 16 is employed to measure the brightness of the scene and provide an exposure meter function for the user to refer to when manually setting the ISO speed rating, aperture and shutter speed. In this case, as the user changes one or more settings, the light meter indicator presented on viewfinder display 70 tells the user to what degree the image will be over or underexposed. In an automatic exposure mode, the user changes one setting and the exposure controller 40 automatically alters another setting to maintain correct exposure, e.g., for a given ISO speed rating when the user reduces the lens aperture, the exposure controller 40 automatically increases the exposure time to maintain the same overall exposure.

The ISO speed rating is an important attribute of a digital still camera. The exposure time, the lens aperture, the lens transmittance, the level and spectral distribution of the scene illumination, and the scene reflectance determine the exposure level of a digital still camera. When an image from a digital still camera is obtained using an insufficient exposure, proper tone reproduction can generally be maintained by increasing the electronic or digital gain, but the resulting image will often contain an unacceptable amount of noise. As the exposure is increased, the gain is decreased, and therefore the image noise can normally be reduced to an acceptable level. If the exposure is increased excessively, the resulting signal in bright areas of the image can exceed the maximum signal level capacity of the image sensor or camera signal processing. This can cause image highlights to be clipped to form a uniformly bright area, or to "bloom" into surrounding areas of the image. Therefore, it is important to guide the user in setting proper exposures. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposures. It is therefore possible for digital still cameras to have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating. With this in mind, the inherent ISO speed is a numerical value calculated from the exposure provided at the focal plane of a digital still camera to produce specified camera output signal characteristics. The inherent speed is typically the exposure index value that produces peak image quality for a given camera system for normal scenes, where the exposure index is a numerical value that is inversely proportional to the exposure provided to the image sensor.

The foregoing description of a digital camera will be familiar to one skilled in the art. It will be obvious that there are many variations of this embodiment that are possible and are selected to reduce the cost, add features or improve the performance of the camera. The following description will disclose in detail the operation of this camera for capturing images according to the present invention. Although this description is with reference to a digital camera, it will be understood that the present invention applies for use with any type of image capture device having an image sensor with pixels for a plurality of color channels.

The color filter array image sensor 20 shown in FIG. 1 typically includes a two-dimensional array of light sensitive pixels fabricated on a silicon substrate that provide a way of converting incoming light at each pixel into an electrical signal that is measured. As the color filter array image sensor 20 is exposed to light, free electrons are generated and captured within the electronic structure at each pixel. Capturing these free electrons for some period of time and then measuring the number of electrons captured, or measuring the rate at which free electrons are generated can measure the light level at each pixel. In the former case, accumulated charge is shifted out of the array of pixels to a charge-to-voltage measurement circuit as in a charge coupled device (CCD), or the area close to each pixel can contain elements of a charge-to-voltage measurement circuit as in an active pixel sensor (APS or CMOS sensor).

Whenever general reference is made to an image sensor in the following description, it is understood to be representative of the color filter array image sensor 20 from FIG. 1. It is further understood that all examples and their equivalents of image sensor architectures and pixel patterns of the present invention disclosed in this specification is used for color filter array image sensor 20.

In the context of an image sensor, a pixel (a contraction of "picture element") refers to a discrete light sensing area and charge shifting or charge measurement circuitry associated with the light sensing area. In the context of a digital color image, the term pixel commonly refers to a particular location in the image having associated color values.

Figure 2:
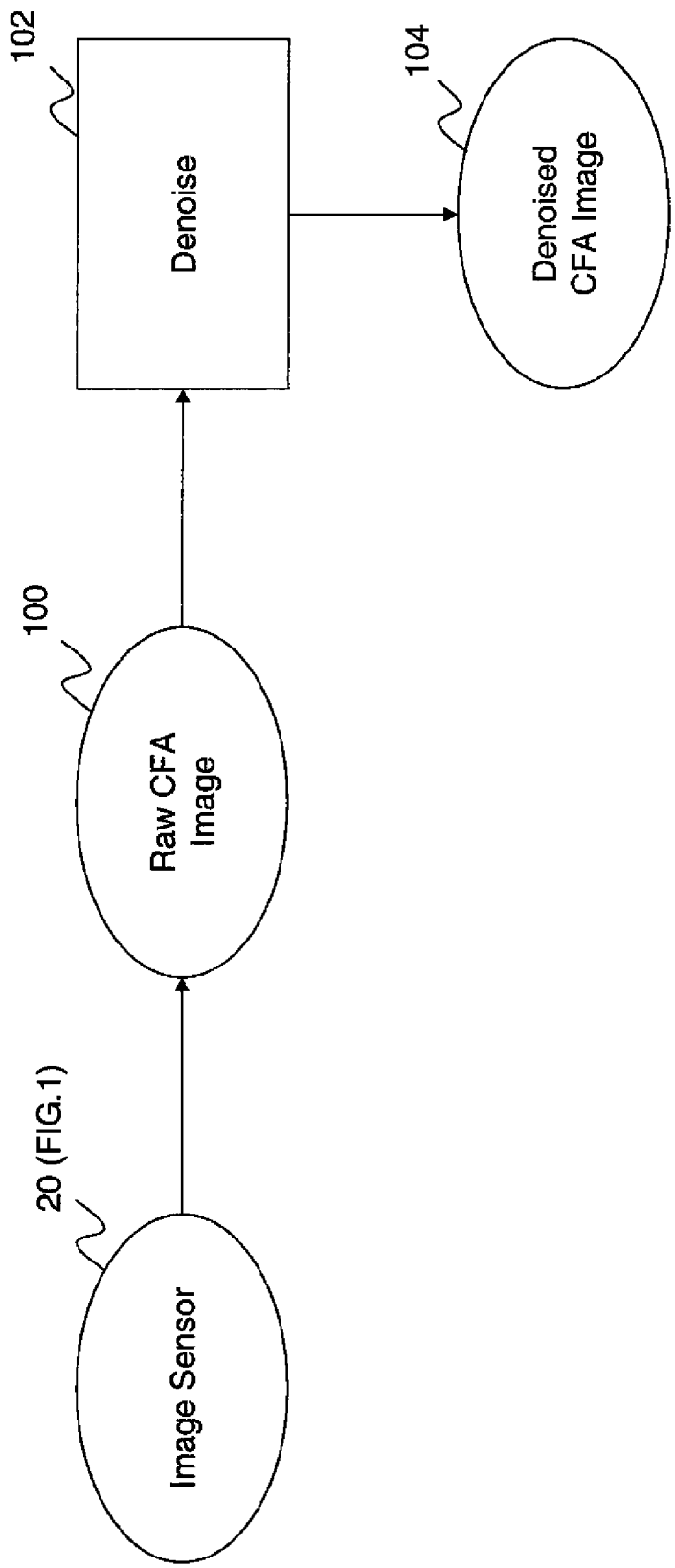
FIG. 2 is a block diagram showing the preferred embodiment of the present invention.

FIG. 2 is a flowchart of a high-level view of the preferred embodiment of the present invention. A raw color filter array (CFA) image 100 is produced by the image sensor 20 (FIG. 1). A denoised (noise-reduced) CFA image 104 is produced by the denoise block 102 by processing the raw CFA image 100.

Figure 3:
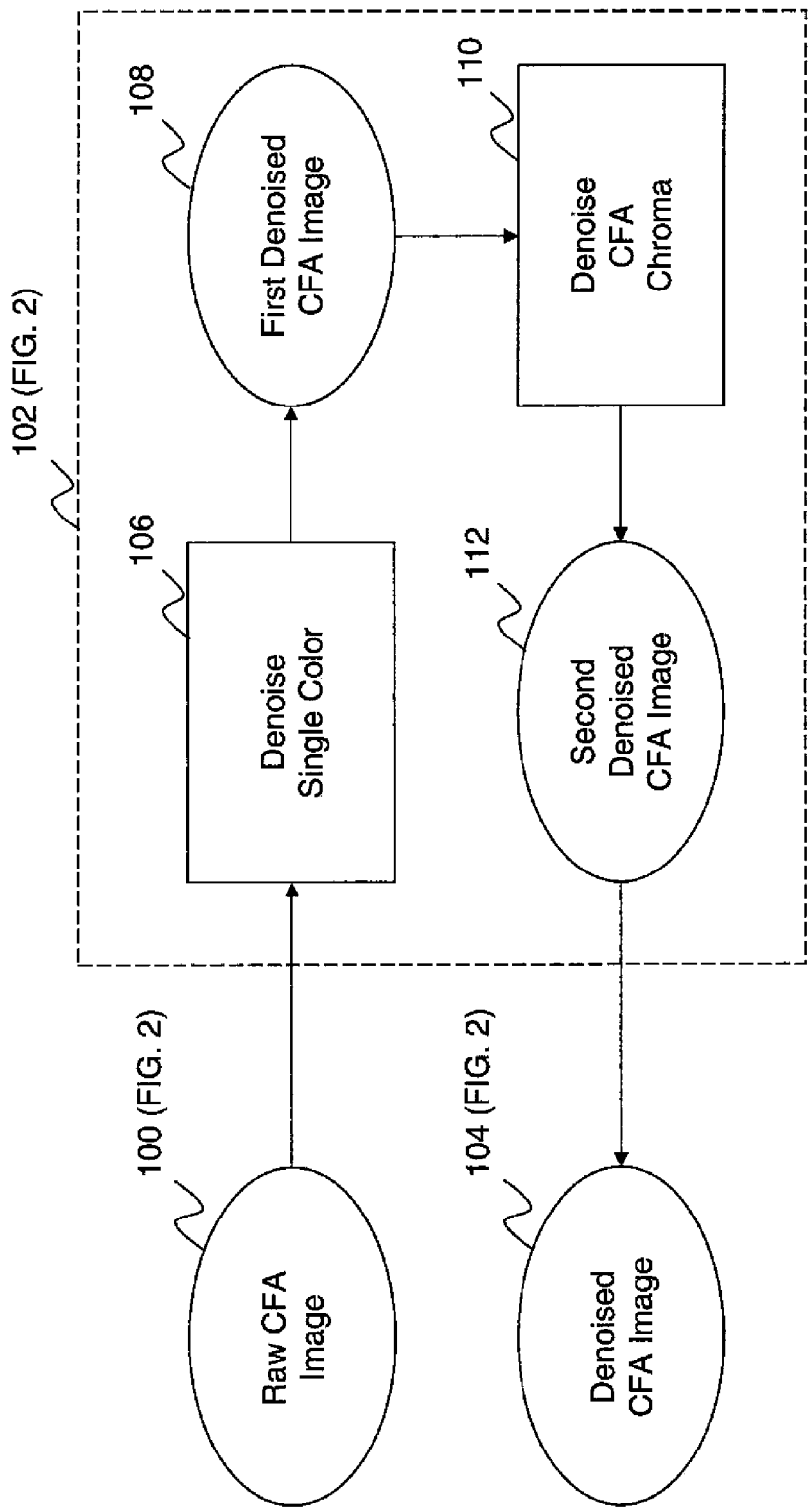
FIG. 3 is a block diagram showing a detailed view of the denoise single color block for a preferred embodiment of the present invention.

FIG. 3 is a detailed description of the denoise block 102 (FIG. 2) according to a preferred embodiment of the present invention. A denoise single color block 106 produces a first denoised CFA image 108 from the raw CFA image 100. Next, a denoise CFA chroma block 110 produces a second denoised CFA image 112 by applying further processing to the first denoised CFA image 108. The second denoised CFA image 112 becomes the denoised CFA image 104.

Figure 4:
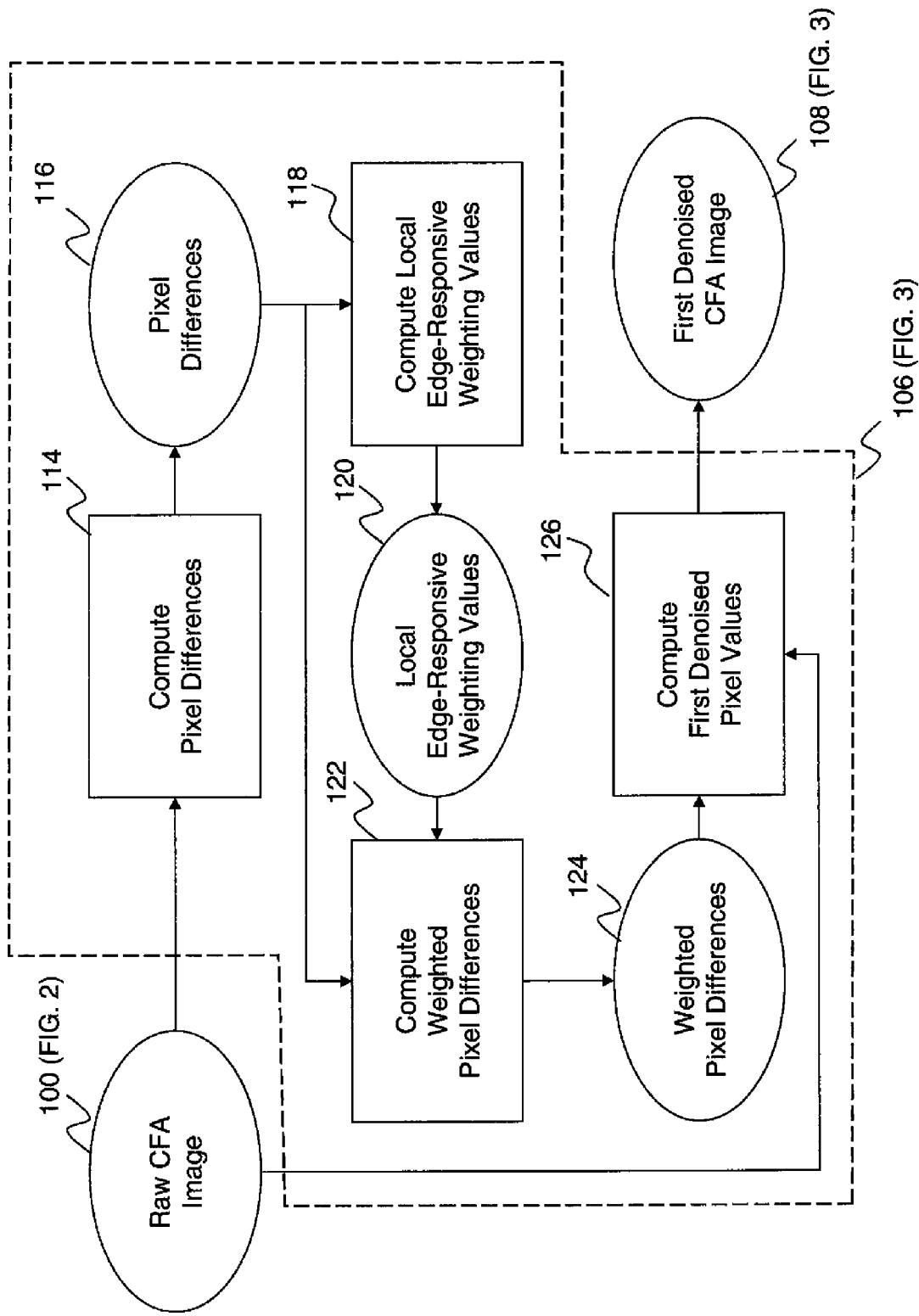
FIG. 4 is a block diagram showing a detailed view of the denoise CFA luma block for a preferred embodiment of the present invention.

FIG. 4 shows a detailed description of the denoise single color block 106 (FIG. 3). The compute pixel differences block 114 produces pixel difference 116 from the raw CFA image 100. The computer local edge-responsive weighting values block 118 produces local edge-responsive weighting values 120 from the pixel differences 116. The compute weighted pixel differences block 122 produces weighted pixel differences 124 from the local edge-responsive weighting values 120. Finally, the compute first denoised pixel values block 126 produces the first denoised CFA image 108 from the weighted pixel differences 124.

The compute pixel differences block 114 in FIG. 4 is computed in the following manner. FIG. 7 shows a region of pixels from the raw CFA image 100. In the following discussion it is assumed that pixel value $G_E$ is being denoised. Four pixel differences 116 ($\delta_N$, $\delta_S$, $\delta_E$ and $\delta_W$) are computed by compute pixel differences block 114 as shown in the following equations:

$$\delta_N = G_2 - G_E \tag{1}$$

$$\delta_S = G_R - G_E \tag{2}$$

$$\delta_E = G_G - G_E \tag{3}$$

$$\delta_W = G_C - G_E \tag{4}$$

The pixels differences $\delta_N$, $\delta_S$, $\delta_E$ and $\delta_W$, are the differences between the pixel value being denoised ($G_E$) and the four nearest pixel values of the same color in the up (N="north"), down (S="south"), right (E="east") and left (W="west") directions ($G_2$, $G_R$, $G_G$, $G_C$). Once these pixel differences are computed, local edge-responsive weighting values are computed by compute local edge-responsive weighting values block 118. The values are computed with the following equation.

$$c = \frac{1}{1 + \left(\frac{\|\delta\|}{k_Y}\right)^2} \tag{5}$$

where c is the local edge-responsive weighting value 120, $\delta$ is the pixel difference 116, $k_Y$ is a constant, and $\|\cdot\|$ is a vector norm operator. In the preferred embodiment, the vector norm operator is the absolute value of the pixel difference 116. Additionally, $k_Y$ is set so that large absolute pixel differences, corresponding to strongly visible edges in the raw CFA image 100, produce small local edge-responsive weighting values and small absolute pixel differences, corresponding to flat (smooth) regions in the raw CFA image 100, produce large local edge-responsive weighting values. Continuing with the previous four pixel differences given above, the following four local edge-responsive weighting values are computed as follows:

$$c_N = \frac{1}{1 + \left(\frac{|G_2 - G_E|}{k_Y}\right)^2} \tag{6}$$

$$c_S = \frac{1}{1+\left(\frac{|G_R-G_E|}{k_Y}\right)^2} \quad (7)$$

$$c_E = \frac{1}{1+\left(\frac{|G_G-G_E|}{k_Y}\right)^2} \quad (8)$$

$$c_W = \frac{1}{1+\left(\frac{|G_C-G_E|}{k_Y}\right)^2} \quad (9)$$

The weighted pixel differences 124 are then computed using the pixel differences and the local edge-responsive weighting values using the following equation:

$$w = \delta \cdot c \quad (10)$$

In this equation w is the weighted pixel difference 124, δ is the pixel difference 116 and c is the local edge-responsive weighting value 120. Continuing with the sets of four values given above, the following four weighted pixel differences are computed:

$$w_N = \delta_N \cdot c_N = \frac{G_2-G_E}{1+\left(\frac{|G_2-G_E|}{k_Y}\right)^2} \quad (11)$$

$$w_S = \delta_S \cdot c_S = \frac{G_R-G_E}{1+\left(\frac{|G_R-G_E|}{k_Y}\right)^2} \quad (12)$$

$$w_E = \delta_E \cdot c_E = \frac{G_G-G_E}{1+\left(\frac{|G_G-G_E|}{k_Y}\right)^2} \quad (13)$$

$$w_W = \delta_W \cdot c_W = \frac{G_C-G_E}{1+\left(\frac{|G_C-G_E|}{k_Y}\right)^2} \quad (14)$$

Pixel values for the first denoised CFA image 108 are computed with the following equation:

$$X' = X + \lambda \Sigma_i w_i \quad (15)$$

In this equation X' is the pixel value of the first denoised CFA image 108 (FIG. 3), X is the original pixel value of the raw CFA image 100 (FIG. 2), λ is a rate control constant, and $w_i$ is the weighted pixel difference 124 in the $i^{th}$ direction (N, S, E, or W). The summation is carried out over the plurality of directions i. The rate control constant is generally set to a value less than one so that the results of the equation remain stable and effective when the denoising computations are repeated iteratively as described below. Continuing with the sets of four values from above, the pixel value $G'_E$ of the first denoised CFA image 108 for input pixel $G_E$ is computed.

$$G'_E = G_E + \frac{w_N + w_S + w_E + w_W}{16} \quad (16)$$

where in this expression, λ has been set to 1/16.

In the preceding discussion it was assumed that pixel value $G_E$ (FIG. 7) was being denoised. Similar calculations are applied to compute each pixel of the first denoised CFA image 108. For each pixel, the pixel differences 116, and the local edge-responsive weighting values 120 are computed using nearby pixels of the same color in a plurality of directions around the central pixel being processed. For example, computing the denoised pixel value for pixel $R_F$ would employ pixels $R_3$, $R_D$, $R_H$, and $R_S$, whereas computing the denoised pixel value for pixel $B_K$ would use pixels $B_8$, $B_b$, $B_M$, and $B_X$.

In an alternate embodiment of the present invention the vector norm used in the compute local edge-responsive weighting values block 118 would use two or more colors. As an example the following expressions use the sum of the absolute values of adjacent pixel differences as the vector norm:

$$c_N = \frac{1}{1+\left(\frac{|R_3-R_F|+|G_2-G_E|+|B_8-B_K|}{k_Y}\right)^2} \quad (17)$$

$$c_S = \frac{1}{1+\left(\frac{|R_S-R_F|+|G_R-G_E|+|B_X-B_K|}{k_Y}\right)^2} \quad (18)$$

$$c_E = \frac{1}{1+\left(\frac{|R_H-R_F|+|G_G-G_E|+|B_M-B_K|}{k_Y}\right)^2} \quad (19)$$

$$c_W = \frac{1}{1+\left(\frac{|R_D-R_F|+|G_C-G_E|+|B_I-B_K|}{k_Y}\right)^2} \quad (20)$$

Other vector norms using two or more colors will be well known to those skilled in the art.

In one embodiment of the present invention, the denoise single color block 106 is performed more than once in an iterative manner. As an example, denoise single color block 106 can be performed three times iteratively in order to produce the first denoised CFA image 108. The rate control constant is adjusted based on the number of iterations to be performed so that the resulting first denoised CFA image is appropriately denoised.

Figure 5:
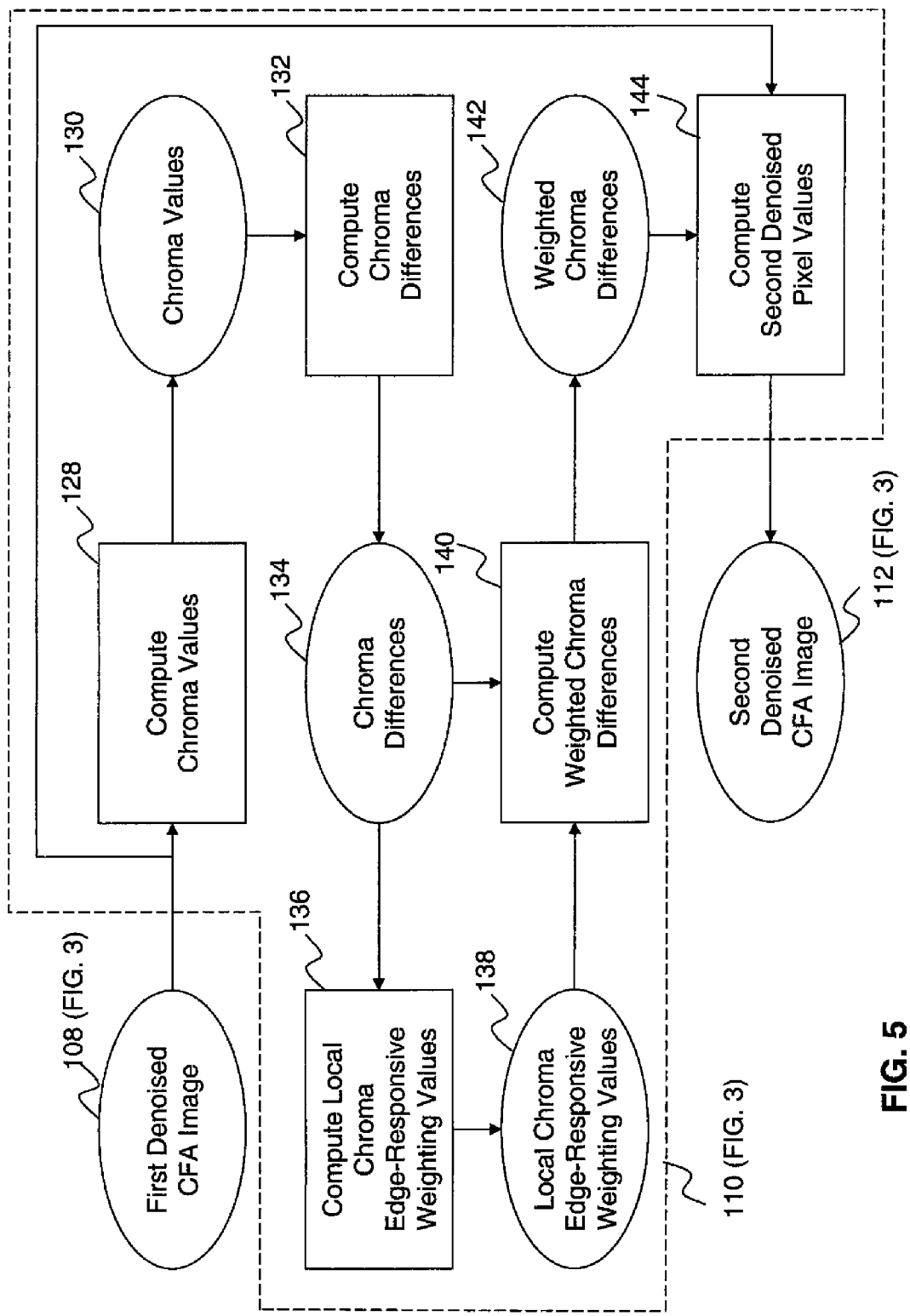
FIG. 5 is a block diagram showing a detailed view of the denoise CFA chroma block for a preferred embodiment of the present invention.

FIG. 5 is a detailed description of the denoise CFA chroma block 110 (FIG. 3). A compute chroma values block 128 produces chroma values 130 from the first denoised CFA image 108. A compute chroma differences block 132 produces chroma difference 134 from the chroma values 130. A compute local chroma edge-responsive weighting values block 136 produces local chroma edge-responsive weighting values 138 from the chroma differences 134. A compute weighted pixel differences block 140 produces weighted chroma differences 142 from the local chroma edge-responsive weighting values 138. Finally, A compute second denoised pixel values block 144 produces the second denoised CFA image 112 from the weighted chroma differences 142.

Figure 6:
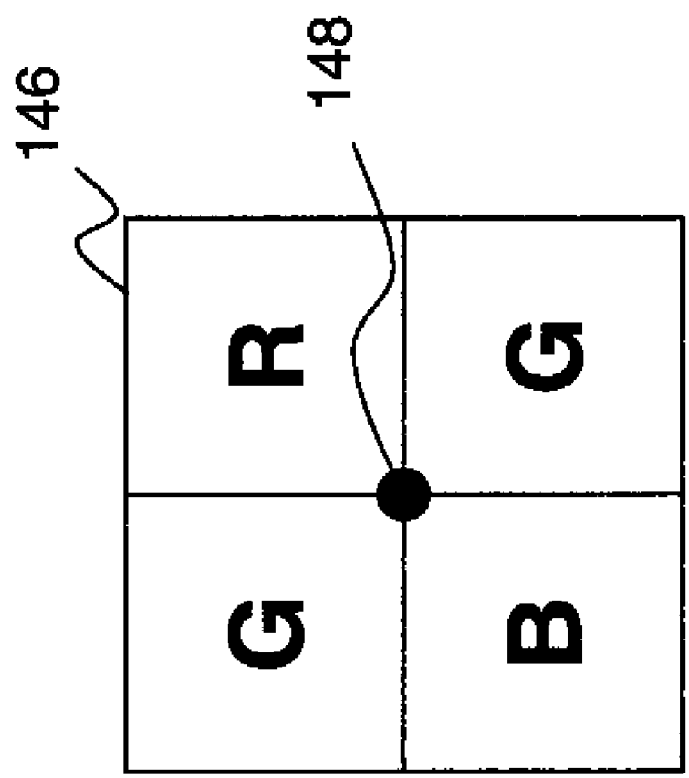
FIG. 6 is a 2×2 block of pixels from the raw CFA image.

In FIG. 5, the compute chroma values block 128 performs computations in the following manner. Referring to FIG. 6, each 2×2 block of pixels 146 that makes up a minimal repeating unit in the raw CFA image 100 is treated as a single pixel in the center 148 possessing each of the pixel values within the 2×2 block of pixels 146. Applying this idea to FIG. 7, the chroma value associated with $G_E$ is computed with the following expression:

$$C_E = 2G_E - R_F - B_K \quad (21)$$

$G_E$ is a green pixel value on a row of green and red pixels. For green pixel values on a row of green and blue pixels a similar expression is used. For example, the following expression is used for computing the chroma value for $G_L$:

$$C_L = 2G_L - R_S - B_M \quad (22)$$

For chroma values associated with blue pixel values, such as $B_K$, the following expression is used:

$$C_K = B_K - R_F \quad (23)$$

Finally, for chroma values associated with red pixel values, such as $R_F$, the previous expression is also used with red and blue values reversed:

$$C_F = R_F - B_A \quad (24)$$

The compute chroma differences block 132 generates chroma difference 134 in the following manner. Again with reference to FIG. 7, the following chroma differences are computed for $G_E$:

$$\delta_N = C_2 - C_E = (2G_2 - R_3 - B_8) - (2G_E - R_F - B_K) \quad (25)$$

$$\delta_S = C_R - C_E = (2G_R - R_5 - B_X) - (2G_E - R_F - B_K) \quad (26)$$

$$\delta_E = C_G - C_E = (2G_G - R_H - B_M) - (2G_E - R_F - B_K) \quad (27)$$

$$\delta_W = C_C - C_E = (2G_C - R_D - B_I) - (2G_E - R_F - B_K) \quad (28)$$

For $B_K$ the following chroma differences are computed:

$$\delta_N = C_8 - C_K = (B_8 - R_3) - (B_K - R_F) \quad (29)$$

$$\delta_S = C_X - C_K = (B_X - R_5) - (B_K - R_F) \quad (30)$$

$$\delta_E = C_M - C_K = (B_M - R_H) - (B_K - R_F) \quad (31)$$

$$\delta_W = C_I - C_K = (B_I - R_D) - (B_K - R_F) \quad (32)$$

As before, for $R_F$ the expressions for $B_K$ are used with red and blue pixel values exchanged.

The compute local chroma edge-responsive weighting values block 136 produces local chroma edge-responsive weighting values 138 in the following way:

$$c = \frac{1}{1 + \left(\frac{\|\delta\|}{k_C}\right)^2} \quad (33)$$

In this equation c is the local chroma edge-responsive weighting value 138, $\delta$ is the chroma difference 134, $k_C$ is a constant, and $\|\cdot\|$ is a vector norm operator. In the preferred embodiment, the vector norm operator is the absolute value of the chroma difference 134. Additionally, $k_C$ is set so that large absolute chroma differences, corresponding to strongly visible edges in the first denoised CFA image 108, produce small local chroma edge-responsive weighting values, and small absolute chroma differences, corresponding to flat (smooth) regions in the first denoised CFA image 108, produce large local chroma edge-responsive weighting values.

Continuing with the previous four chroma differences for $G_E$ given above, the following four local chroma edge-responsive weighting values are computed:

$$c_N = \frac{1}{1 + \left(\frac{|C_2 - C_E|}{k_C}\right)^2} \quad (34)$$

$$c_S = \frac{1}{1 + \left(\frac{|C_R - C_E|}{k_C}\right)^2} \quad (35)$$

$$c_E = \frac{1}{1 + \left(\frac{|C_G - C_E|}{k_C}\right)^2} \quad (36)$$

$$c_W = \frac{1}{1 + \left(\frac{|C_C - C_E|}{k_C}\right)^2} \quad (37)$$

The local chroma edge-responsive weighting values for $B_K$ would be computed in the following manner:

$$c_N = \frac{1}{1 + \left(\frac{|C_8 - C_K|}{k_C}\right)^2} \quad (38)$$

$$c_S = \frac{1}{1 + \left(\frac{|C_X - C_K|}{k_C}\right)^2} \quad (39)$$

$$c_E = \frac{1}{1 + \left(\frac{|C_M - C_K|}{k_C}\right)^2} \quad (40)$$

$$c_W = \frac{1}{1 + \left(\frac{|C_I - C_K|}{k_C}\right)^2} \quad (41)$$

The local chroma edge-responsive weighting values for $R_F$ are computed in a similar manner as done for $B_K$.

The compute weighted chroma difference block 140 produces weighted chroma differences 142 with the following equation:

$$w = \delta \cdot c \quad (42)$$

In this equation w is the weighted chroma difference 142, $\delta$ is the chroma difference 134 and c is the local chroma edge-responsive weighting value 138. Continuing with the sets of four values for $G_E$ given above, the following four weighted chroma differences are computed:

$$w_N = \delta_N \cdot c_N = \frac{C_2 - C_E}{1 + \left(\frac{|C_2 - C_E|}{k_C}\right)^2} \quad (43)$$

$$w_S = \delta_S \cdot c_S = \frac{C_R - C_E}{1 + \left(\frac{|C_R - C_E|}{k_C}\right)^2} \quad (44)$$

$$w_E = \delta_E \cdot c_E = \frac{C_G - C_E}{1 + \left(\frac{|C_G - C_E|}{k_C}\right)^2} \quad (45)$$

$$w_W = \delta_W \cdot c_W = \frac{C_C - C_E}{1 + \left(\frac{|C_C - C_E|}{k_C}\right)^2} \quad (46)$$

The weighted chroma differences for $B_K$ are computed in the following manner:

$$w_N = \delta_N \cdot c_N = \frac{C_8 - C_K}{1 + \left(\frac{|C_8 - C_K|}{k_C}\right)^2} \quad (47)$$

$$w_S = \delta_S \cdot c_S = \frac{C_X - C_K}{1 + \left(\frac{|C_X - C_K|}{k_C}\right)^2} \quad (48)$$

-continued $$w_E = \delta_E \cdot c_E = \frac{C_M - C_K}{1 + \left(\frac{|C_M - C_K|}{k_C}\right)^2} \quad (49)$$

$$w_W = \delta_W \cdot c_W = \frac{C_I - C_K}{1 + \left(\frac{|C_I - C_K|}{k_C}\right)^2} \quad (50)$$

The weighted chroma differences for $R_F$ are computed in a similar way as for $B_K$.

The compute second denoised pixel values block 144 produces the second denoised CFA image 112 from the pixel values of the first denoised CFA image 108 and the weighted chroma differences 142 with the following equation for green values:

$$X' = X + \lambda \Sigma_i w_i \quad (51)$$

In this equation X' is the pixel value of the second denoised CFA image 112, X is the pixel value of the first denoised CFA image 108, λ is a rate control constant, and $w_i$ is the weighted chroma difference 142 in the $i^{th}$ direction (N, S, E, or W). The summation is carried out over the plurality of directions i. The rate control constant λ is generally set to a value less than one so that the results of the equation remain stable and effective when the denoising computations are repeated iteratively as described below.

Continuing with the sets of four values for $G_E$ from above, the pixel value for the second denoised CFA image 112 for pixel $G_E$ is computed as follows:

$$G'_E = G_E + \frac{w_N + w_S + w_E + w_W}{32} \quad (52)$$

In the above expression λ has been set to 1/32. The pixel value for the second denoised CFA image 112 for pixel $B_K$ is computed as follows:

$$B'_K = B_K + \frac{w_N + w_S + w_E + w_W}{16} \quad (53)$$

In the above expression λ has been set to 1/16. The pixel values for the second denoised CFA image 112 for pixel $R_F$ is computed in a similar way as done for $B_K$.

In an alternate embodiment of the present invention the vector norm used in the compute local chroma edge-responsive weighting values block 136 uses two or more chroma differences. As an example the following expressions use the sum of the absolute values of adjacent chroma differences as the vector norm:

$$c_N = \frac{1}{1 + \left(\frac{|C_2 - C_E| + |C_8 - C_K|}{k_C}\right)^2} \quad (54)$$

$$c_S = \frac{1}{1 + \left(\frac{|C_R - C_E| + |C_X - C_K|}{k_C}\right)^2} \quad (55)$$

$$c_E = \frac{1}{1 + \left(\frac{|C_G - C_E| + |C_M - C_K|}{k_C}\right)^2} \quad (56)$$

$$c_W = \frac{1}{1 + \left(\frac{|C_C - C_E| + |C_I - C_K|}{k_C}\right)^2} \quad (57)$$

These same local chroma edge-responsive weighting values can be used to compute second denoised CFA pixel values for more than one color channel (e.g., $G_E$ and $B_K$). Other vector norms using two or more chroma differences will be well known to those skilled in the art.

In the previous discussion, a single application of the denoise CFA chroma block 110 was described. In an alternate embodiment of the present invention denoise CFA chroma block 110 is performed more than once in an iterative manner. As an example, denoise CFA chroma block 110 can be performed three times iteratively in order to produce the second denoised CFA image 112. The rate control constant λ is adjusted based on the number of iterations to be performed so that the resulting second denoised CFA image is appropriately denoised.

Figure 8:
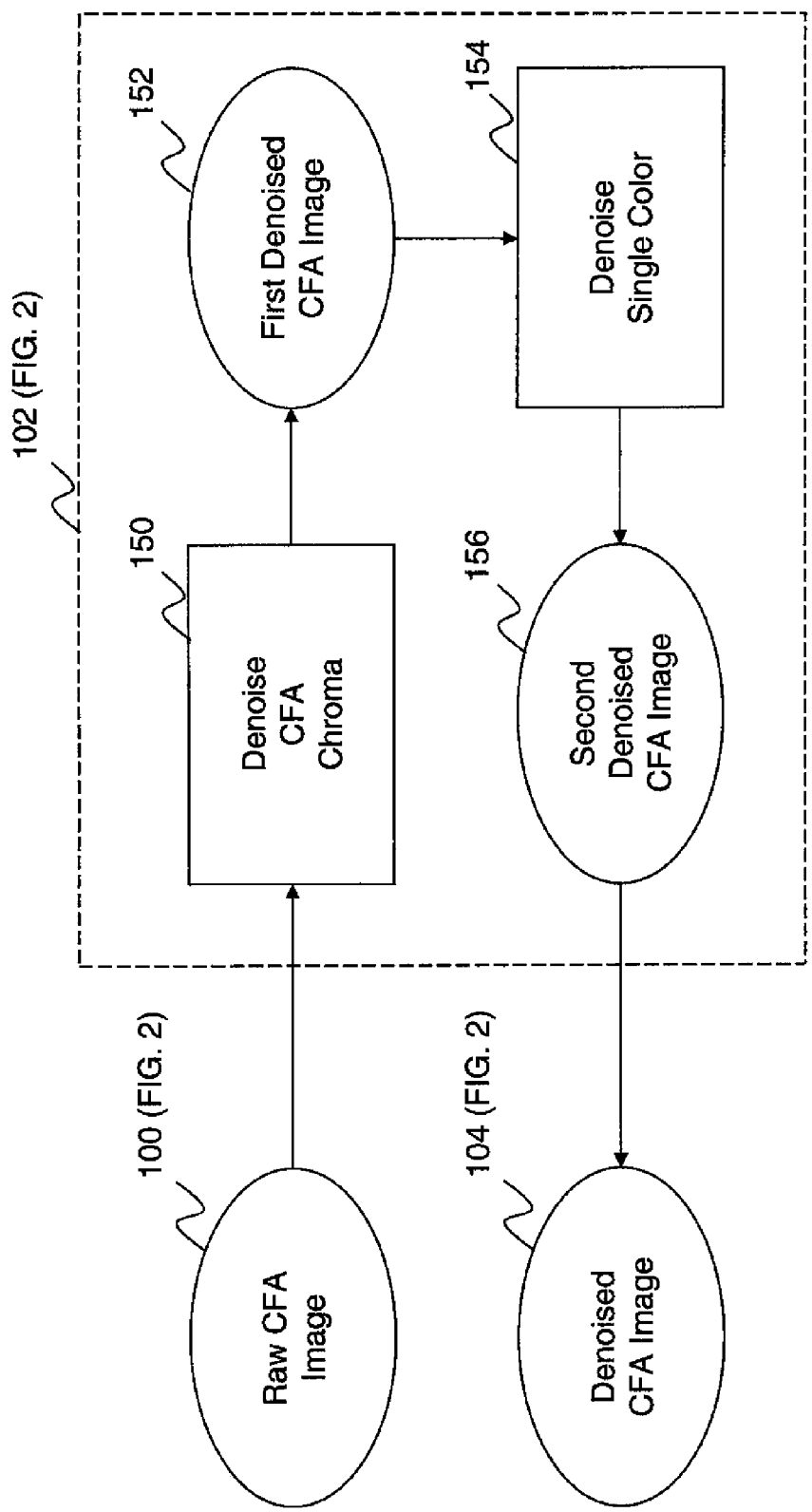
FIG. 8 is a block diagram showing an alternate embodiment of the present invention.

FIG. 8 shows an alternate embodiment of the denoise block 102 (FIG. 2) according to the present invention. Compared with the preferred embodiment shown in FIG. 3, the order of denoise CFA chroma block 150 and denoise single color block 154 have been exchanged. The denoise CFA chroma block 150 produces a first denoised CFA image 152 from the raw CFA image 100. The denoise single color block 154 produces a second denoised CFA image 156 from the first denoised CFA image 152. The second denoised CFA image 156 becomes the denoised CFA image 104. The denoise CFA chroma block 150 performs the same calculations as the denoise CFA chroma block 110 (FIG. 3). The denoise single color block 154 performs the same computations as the denoise single color block 106 (FIG. 3).

Figure 9:
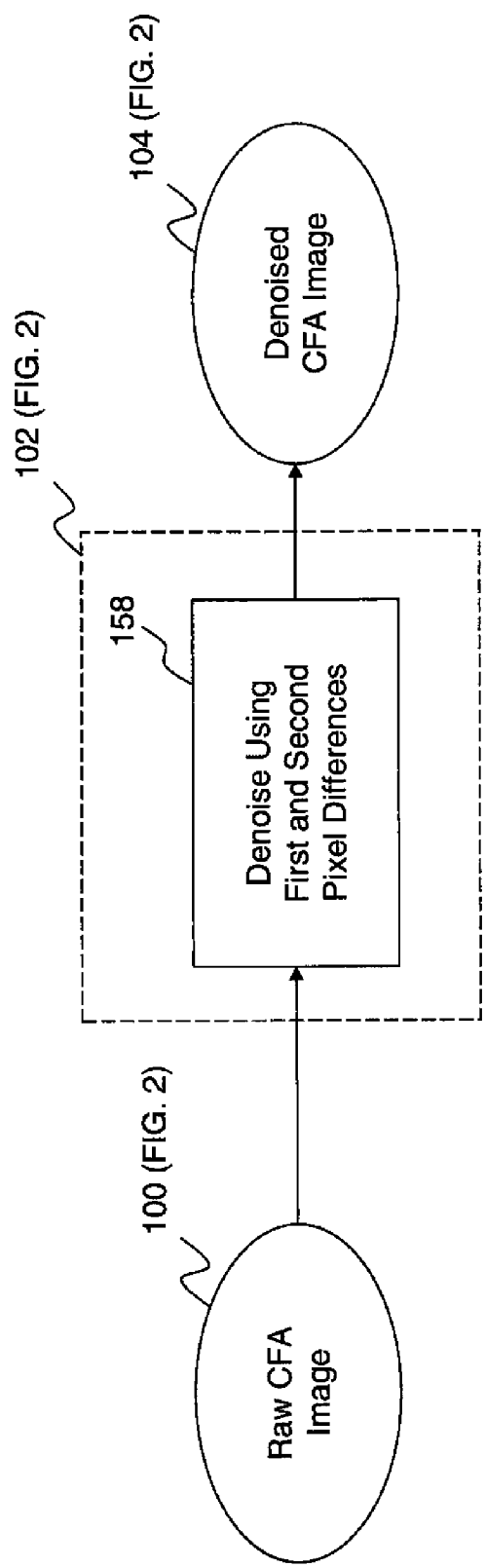
FIG. 9 is a block diagram showing a third embodiment of the present invention.

FIG. 9 shows another alternate embodiment of the denoise block 102 (FIG. 2) according to the present invention. Compared with the embodiments shown in FIG. 3 and FIG. 8, the denoise block 102 does not contain two separate noise reducing processes but rather contains a single denoise using first and second pixel differences block 158 that simultaneously reduces both the single channel and chrominance noise.

Figure 10:
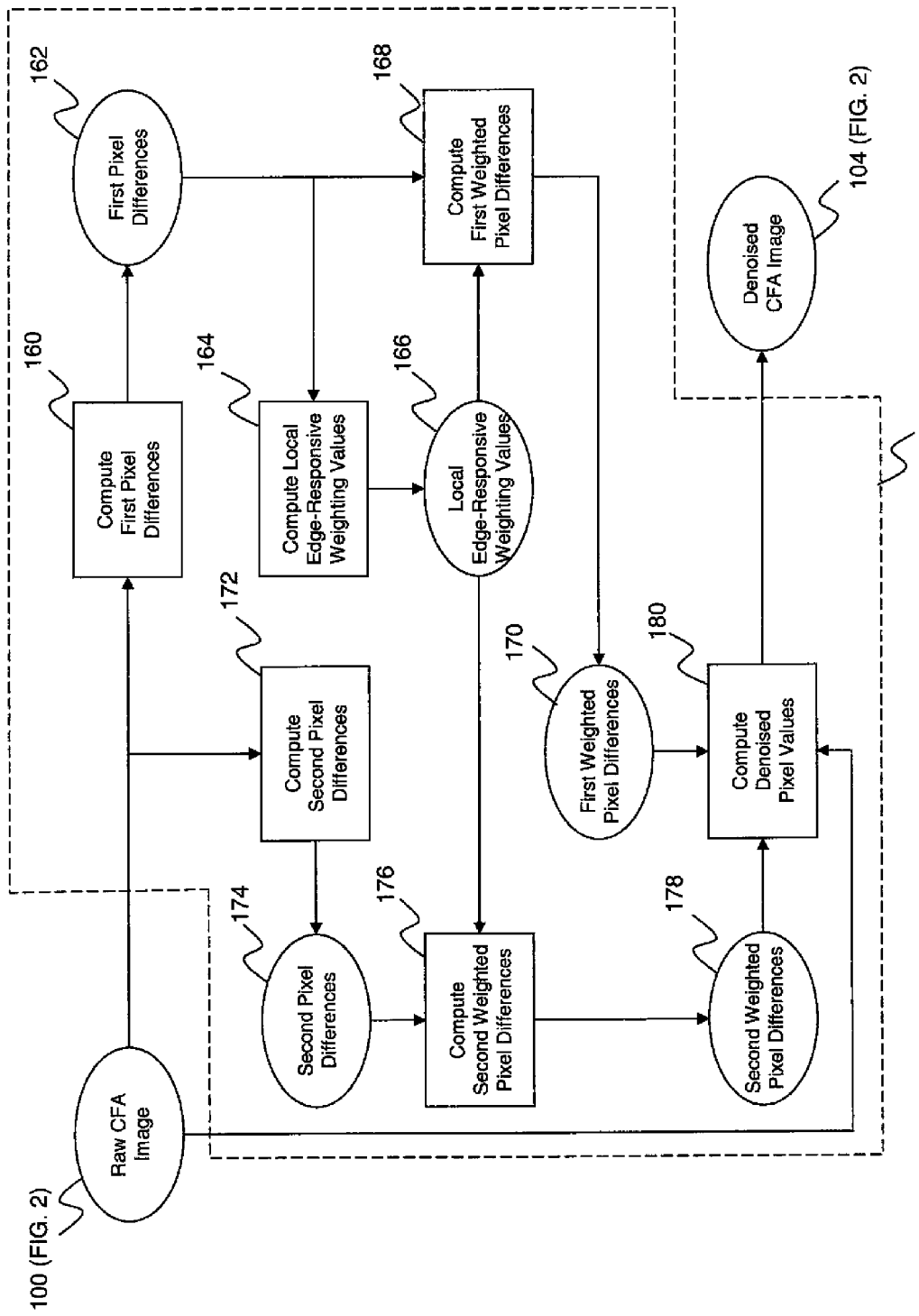
FIG. 10 is a block diagram showing a detailed view of the denoise using first and second pixel differences block in the FIG. 9 embodiment.

FIG. 10 is a flowchart showing a detailed view of the denoise using first and second pixel differences block 158 (FIG. 9). For each pixel of a first color channel a compute pixel first differences block 160 produces first pixel differences 162 from the raw CFA image 100. A compute local edge-responsive weighting values block 164 produces local edge-responsive weighting values 166 from the first pixel differences 162. A compute first weighted pixel differences block 168 produces first weighted pixel differences 170 from the local edge-responsive weighting values 166 and the first pixel differences 162.

For each pixel of a second color channel, a compute second pixel differences block 172 produces second pixel difference 174 from the raw CFA image 100. A compute second weighted pixel differences block 176 produces second weighted pixel differences 178 from the local edge-responsive weighting values 166 and the second pixel differences 174. Finally, a compute denoised pixel values block 180 produces the first denoised CFA image 108 from the first weighted pixel differences 170 and the second weighted pixel differences 178.

In FIG. 10, the compute first pixel differences block 160 is computed in the following manner. FIG. 7 shows a region of pixels from the raw CFA image 100 (FIG. 2). In the following discussion it is assumed that pixel value $G_E$ is being denoised.

Four first pixel differences are computed by compute first pixel differences block 160 as shown in the following equations:

$$\delta_N = G_2 - G_E \quad (58)$$

$$\delta_S = G_R - G_E \quad (59)$$

$$\delta_E = G_G - G_E \quad (60)$$

$$\delta_W = G_C - G_E \quad (61)$$

The first pixels differences are the differences between the pixel value being denoised ($G_E$) and the four nearest pixel values of the same color channel ($G_2$, $G_R$, $G_G$, $G_C$).

Once these first pixel differences are computed, local edge-responsive weighting values 166 are computed by compute local edge-responsive weighting values block 164. The values are computed with the following equation:

$$c = \frac{1}{1 + \left(\frac{\|\delta\|}{k_Y}\right)^2} \quad (62)$$

In this equation c is the local edge-responsive weighting value 166, δ is the first pixel difference 162, $k_Y$ is a constant, and $\|\cdot\|$ is a vector norm operator. In one embodiment, the vector norm operator is the absolute value of the first pixel difference 162. Additionally, $k_Y$ is set so that large absolute first pixel differences, corresponding to strongly visible edges in the raw CFA image 100, produce small local edge-responsive weighting values, and small absolute first pixel differences, corresponding to flat (smooth) regions in the raw CFA image 100, produce large local edge-responsive weighting values.

Continuing with the previous four first pixel differences given above, the following four local edge-responsive weighting values are computed:

$$c_N = \frac{1}{1 + \left(\frac{|G_2 - G_E|}{k_Y}\right)^2} \quad (63)$$

$$c_S = \frac{1}{1 + \left(\frac{|G_R - G_E|}{k_Y}\right)^2} \quad (64)$$

$$c_E = \frac{1}{1 + \left(\frac{|G_G - G_E|}{k_Y}\right)^2} \quad (65)$$

$$c_W = \frac{1}{1 + \left(\frac{|G_C - G_E|}{k_Y}\right)^2} \quad (66)$$

The first weighted pixel differences 170 are then computed using the first pixel differences 162 and the local edge-responsive weighting values 166 using the following equation:

$$w = \delta \cdot c \quad (67)$$

In this equation w is the first weighted pixel difference 170, δ is the first pixel difference 162 and c is the local edge-responsive weighting value 166.

Continuing with the sets of four values given above, the following four first weighted pixel differences are computed:

$$w_N = \delta_N \cdot c_N = \frac{G_2 - G_E}{1 + \left(\frac{|G_2 - G_E|}{k_Y}\right)^2} \quad (68)$$

$$w_S = \delta_S \cdot c_S = \frac{G_R - G_E}{1 + \left(\frac{|G_R - G_E|}{k_Y}\right)^2} \quad (69)$$

$$w_E = \delta_E \cdot c_E = \frac{G_G - G_E}{1 + \left(\frac{|G_G - G_E|}{k_Y}\right)^2} \quad (70)$$

$$w_W = \delta_W \cdot c_W = \frac{G_C - G_E}{1 + \left(\frac{|G_C - G_E|}{k_Y}\right)^2} \quad (71)$$

Four second pixel differences 174 are computed by compute second pixel differences block 172 as shown in the following equations:

$$D_N = B_8 - B_K \quad (72)$$

$$D_S = B_X - B_K \quad (73)$$

$$D_E = R_H - R_F \quad (74)$$

$$D_W = R_D - R_F \quad (75)$$

The second pixels differences are the differences between the pixel values for the nearest pixels to the pixel being denoised that are of a different color channel from the pixel being denoised (e.g., of the non-green pixels within the 2×2 block of pixels 146 that make up CFA minimal repeating unit (FIG. 6), $B_K$ and $R_F$ are nearest $G_E$) and the four nearest pixel values of the same color channel as the nearest pixels (e.g., of the blue pixels, $B_8$ and $B_X$ are nearest $B_K$, and of the red pixels, $R_H$ and $R_D$ are nearest $R_F$). The second weighted pixel differences 178 are then computed using the second pixel differences 174 and the local edge-responsive weighting values 166 using the following equation:

$$u = D \cdot c \quad (76)$$

In this equation u is the second weighted pixel difference 178, D is the second pixel difference 174 and c is the local edge-responsive weighting value 166.

Continuing with the sets of four values given above, the following four second weighted pixel differences are computed:

$$u_N = D_N \cdot c_N = \frac{B_8 - B_K}{1 + \left(\frac{|G_2 - G_E|}{k_Y}\right)^2} \quad (77)$$

$$u_S = D_S \cdot c_S = \frac{B_X - B_K}{1 + \left(\frac{|G_R - G_E|}{k_Y}\right)^2} \quad (78)$$

$$u_E = D_E \cdot c_E = \frac{R_H - R_F}{1 + \left(\frac{|G_G - G_E|}{k_Y}\right)^2} \quad (79)$$

$$u_W = D_W \cdot c_W = \frac{R_D - R_F}{1 + \left(\frac{|G_C - G_E|}{k_Y}\right)^2} \quad (80)$$

The compute denoised pixel value block 180 carries out the following computation:

$$X'+X+\lambda\Sigma_i[w_i(w_i-u_i)] \tag{81}$$

In this equation X' is the denoised pixel value of the denoised CFA image 104, X is the original pixel value of the raw CFA image 100, λ is a rate control constant, $w_i$ is the first weighted pixel difference 170 in the $i^{th}$ direction (N, S, E, or W), and $u_i$ is the second weighted pixel difference 178 in the $i^{th}$ direction (N, S, E, or W). The summation is carried out across the plurality of directions i. The first term $w_i$ in the sum enables single channel noise reduction and, since there is no information from any other channels, by itself cannot reduce chrominance noise. The addition of the term $w_i-u_i$ is equivalent to constraining the solution X' such that the first and second pixel differences of the denoised CFA image 104 are equal. When the first and second pixel differences of a CFA image are approximately equal, that CFA image contains reduced chrominance noise. Therefore adding the term $w_i-u_i$ enables the simultaneous denoising of both the single color and chrominance components.

In the preceding example calculations it was assumed that pixel value $G_E$ (FIG. 7) was being denoised. All other pixel values, regardless of color channel, would be processed in the same way.

In an alternate embodiment of the present invention the vector norm used in the compute local edge-responsive weighting values block 164 would use two or more color channels.

In the previous discussion, a single application of the denoise using first and second pixel differences block 158 was described. In an alternate embodiment of the present invention denoise using first and second pixel differences block 158 is performed more than once in an iterative manner. The rate control constant λ is adjusted based on the number of iterations to be performed so that the resulting first denoised CFA image is appropriately denoised.

The algorithm for computing the denoised CFA image as disclosed in the preferred embodiment of the present invention can be employed in a variety of user contexts and environments. Exemplary contexts and environments include, without limitation, in-camera processing (reading sensor image, digital processing, saving processed image on digital media), wholesale digital photofinishing (which involves exemplary process steps or stages such as submitting digital images for wholesale fulfillment, digital processing, and digital printing), retail digital photofinishing (submitting digital images for retail fulfillment, digital processing, and digital printing), home printing (inputting home digital images, digital processing, and printing on a home printer), desktop software (software that applies algorithms to digital images to make them better—or even just to change them), digital fulfillment (inputting digital images—from media or over the web, digital processing, outputting digital images—on media, digital form over the interne), kiosks (inputting digital images, digital processing, digital printing or outputting digital media), mobile devices (e.g., PDA or cell phone that can be used as a processing unit, a display unit, or a unit to give processing instructions), and as a service offered via the World Wide Web.

In each case, the algorithm for computing the denoised CFA image can stand alone or can be a component of a larger system solution. Furthermore, the interfaces with the algorithm (e.g., the input, the digital processing, the display to a user (if needed), the input of user requests or processing instructions (if needed), and the output) can each be on the same or different devices and physical locations, and communication between the devices and locations can be via public or private network connections, or media based communication. Where consistent with the foregoing disclosure of the present invention, the algorithms themselves can be fully automatic, can have user input (i.e., they can be fully or partially manual), can have user or operator review to accept/reject the result, or can be assisted by metadata (metadata can be user supplied, supplied by a measuring device (e.g. in a camera) or determined by an algorithm). Moreover, the algorithms can interface with a variety of workflow user interface schemes.

The above discussion has been based on the example CFA pattern having the minimal repeating unit shown in FIG. 6. In this case, the minimal repeating unit contains 2 green (G) pixels, 1 red (R) pixel and 1 blue (B) pixel. It will be obvious to one skilled in the art that the method can be used with any other types of CFA patterns as well. For example, it can be used with CFA patterns where the RGB pixels are arranged in different patterns. Similarly, it can be used with CFA patterns that utilize other types of pixels such as cyan (C), magenta (M) or yellow (Y) pixels or panchromatic (P) pixels. Panchromatic pixels are sensitive to all wavelengths of light, and are typically made using a clear filter, or no filter, over the sensing element. Examples of many such CFA patterns having different spectral sensitivities and different spatial arrangements will be well known to one skilled in the art. For example, U.S. Patent Application Publication 2007/0268533 to Kijima et al., entitled "Image sensor with improved light sensitivity," describes a variety of different CFA patterns including panchromatic pixels. The method of the present invention can also be used with CFA patterns that utilize pixels that are sensitive to non-visible radiation such as infrared (IR) or ultraviolet (UV) radiation.

The computation of the denoised CFA image algorithm disclosed herein in accordance with the invention can have interior components that utilize various data detection and reduction techniques (e.g., face detection, eye detection, skin detection, flash detection).

The invention has been described in detail with particular reference to certain preferred embodiments thereof, but it will be understood that variations and modifications can be effected within the spirit and scope of the invention.

PARTS LIST

| | |
|---|---|
| 10 | light |
| 11 | imaging stage |
| 12 | lens |
| 13 | neutral density filter block |
| 14 | iris block |
| 16 | brightness sensor block |
| 18 | shutter |
| 20 | color filter array image sensor |
| 22 | analog signal processor |
| 24 | A/D converter |
| 26 | timing generator |
| 28 | image sensor stage |
| 30 | bus |
| 32 | DSP memory |
| 36 | DSP |
| 38 | processing stage |
| 40 | exposure controller |
| 50 | system controller |
| 52 | system controller bus |
| 54 | program memory |
| 56 | system memory |
| 57 | host interface |
| 60 | memory card interface |
| 62 | memory card socket |

-continued

PARTS LIST

| | |
|---|---|
| 64 | memory card |
| 68 | user interface |
| 70 | viewfinder display |
| 72 | exposure display |
| 74 | user inputs |
| 76 | status display |
| 80 | video encoder |
| 82 | display controller |
| 88 | image display |
| 100 | raw CFA image |
| 102 | denoise block |
| 104 | denoised CFA image |
| 106 | denoise single color block |
| 108 | first denoised CFA image |
| 110 | denoise CFA chroma block |
| 112 | second denoised CFA image |
| 114 | compute pixel differences block |
| 116 | pixel differences |
| 118 | compute local edge-responsive weighting values block |
| 120 | local edge-responsive weighting values |
| 122 | compute weighted pixel differences block |
| 124 | weighted pixel differences |
| 126 | compute first denoised pixel values block |
| 128 | compute chroma values block |
| 130 | chroma values |
| 132 | compute chroma differences block |
| 134 | chroma differences |
| 136 | compute local chroma edge-responsive weighting values block |
| 138 | local chroma edge-responsive weighting values |
| 140 | compute weighted chroma differences block |
| 142 | weighted chroma differences |
| 144 | compute second denoised pixel values block |
| 146 | 2 × 2 block of pixel values |
| 148 | center of 2 × 2 block of pixel values |
| 150 | denoise CFA chroma block |
| 152 | first denoised CFA image |
| 154 | denoise single color block |
| 156 | second denoised CFA image |
| 158 | denoise using first and second pixel differences block |
| 160 | compute first pixel differences block |
| 162 | first pixel differences |
| 164 | compute local edge-responsive weighting values block |
| 166 | local edge-responsive weighting values |
| 168 | compute first weighted pixel differences block |
| 170 | first weighted pixel differences |
| 172 | compute second pixel differences block |
| 174 | second pixel differences |
| 176 | compute second weighted pixel differences block |
| 178 | second weighted pixel differences |
| 180 | compute denoised pixel values block |

What is claimed is:

1. A method for reducing noise in an image captured by a digital image sensor comprising a two dimensional array of light-sensitive pixels including pixels for at least three distinct channels, the pixels being arranged in a rectangular minimal repeating unit, comprising using a processor in determining noise reduced pixel values for each pixel of a first channel using a noise reducing process including:
   a) computing a set of local edge-responsive weighting values for a plurality of directions around a central pixel of the first channel;
   b) computing first pixel differences between the pixel value of the central pixel and pixel values for nearby pixels of the first channel in the plurality of directions;
   c) computing first weighted pixel differences by combining the first pixel differences with the set of local edge-responsive weighting values;
   d) computing second pixel differences between pixel values for pixels of at least one different channel nearby the central pixel and pixel values for nearby pixels of the at least one different channel in the plurality of directions;
   e) computing second weighted pixel differences by combining the second pixel differences with the set of local edge-responsive weighting values; and
   f) computing a noise-reduced pixel value for the central pixel by combining the first and second weighted pixel differences with the pixel value for the central pixel.

2. The method of claim 1 wherein the noise reducing processes is performed multiple times.

3. The method of claim 1 wherein the set of local edge-responsive weighting values are computed using only pixel values of the first channel.

4. The method of claim 1 wherein the set of local edge-responsive weighting values are computed using pixel values of at least two channels.

5. The method of claim 1 wherein the local edge-responsive weighting values are computed using the following equation:

$$c = \frac{1}{1 + \left(\frac{\|\delta\|}{k_Y}\right)^2}$$

where c is the local edge-responsive weighting value, $k_Y$ is a constant, $\delta$ is a pixel difference, and $\|\bullet\|$ is a vector norm operator.

6. The method of claim 1 wherein the first weighted pixel differences are computed as follows:

$$w = \delta \cdot c$$

where w is the first weighted pixel difference, c is the local edge-responsive weighting value, and $\delta$ is the first pixel difference.

7. The method of claim 1 wherein the noise-reduced pixel value is computed as follows:

$$X' = X + \lambda \Sigma_i [w_i + (w_i - u_i)]$$

where X' is the noise-reduced pixel value, X is the central pixel value, $\lambda$ is a rate control constant, $w_i$ are the first weighted pixel differences in the $i^{th}$ direction, $u_i$ are the second weighted pixel differences in the $i^{th}$ direction, and the summation is carried out over the plurality of directions i.

8. The method of claim 1 wherein the pixels of the at least one different channel nearby the central pixel are pixels adjacent to the central pixel in the plurality of directions.

9. The method of claim 1 wherein the pixels of the at least one different channel nearby the central pixel include pixels of at least two different channels.

10. The method of claim 1 wherein the plurality of directions include the directions up, down, left and right relative to the central pixel.

11. The method of claim 1 wherein the at least three distinct channels include red, green and blue channels.

12. The method of claim 1 wherein the at least three distinct channels includes at least one panchromatic channel.

13. The method of claim 1 wherein the second weighted pixel differences are computed as follows:

$$u = D \cdot c$$

where u is the second weighted pixel difference, c is the local edge-responsive weighting value, and D is the second pixel difference.

* * * * *